(12) United States Patent
Manfredotti

(10) Patent No.: US 8,616,353 B2
(45) Date of Patent: Dec. 31, 2013

(54) DEVICE FOR DAMPING THE VIBRATION OF A STRUCTURE

(75) Inventor: Thomas Manfredotti, La Colle sur Loup (FR)

(73) Assignee: Eurocopter, Marignane Cedex (FR)

( * ) Notice: Subject to any disclaimer, the term of this patent is extended or adjusted under 35 U.S.C. 154(b) by 37 days.

(21) Appl. No.: 13/156,676

(22) Filed: Jun. 9, 2011

(65) Prior Publication Data

US 2011/0308905 A1    Dec. 22, 2011

(30) Foreign Application Priority Data

Jun. 17, 2010  (FR) ..................................... 10 02556

(51) Int. Cl.
*F16F 7/10*    (2006.01)

(52) U.S. Cl.
USPC .......................................... 188/380; 267/136

(58) Field of Classification Search
USPC ............................ 188/378, 379, 380; 267/136
See application file for complete search history.

(56) References Cited

U.S. PATENT DOCUMENTS

| | | | | |
|---|---|---|---|---|
| 3,342,172 A | * | 9/1967 | Sanders | ........................ 124/23.1 |
| 4,265,344 A | * | 5/1981 | Taylor | ...................... 188/322.17 |
| 5,351,867 A | * | 10/1994 | Vest | ............................... 224/661 |
| 5,814,963 A | * | 9/1998 | Girard et al. | ................... 318/611 |
| 5,954,169 A | * | 9/1999 | Jensen | ........................... 188/378 |
| 6,119,834 A | * | 9/2000 | Lee | ................................. 188/378 |
| 6,129,177 A | * | 10/2000 | Gwinn | ............................ 181/207 |
| 6,681,908 B2 | * | 1/2004 | Davis | ............................. 188/380 |
| 6,719,503 B1 | * | 4/2004 | McCalmont et al. | .......... 409/141 |
| 7,690,872 B2 | * | 4/2010 | Hashimoto et al. | ............ 409/141 |

FOREIGN PATENT DOCUMENTS

| | | |
|---|---|---|
| FR | 2739670 A1 | 4/1997 |
| FR | 2862392 A1 | 5/2005 |

OTHER PUBLICATIONS

Search Report and Written Opinion; Application No. FR 1002556 Dated; Feb. 23, 2011.

* cited by examiner

*Primary Examiner* — Bradley King
(74) *Attorney, Agent, or Firm* — Brooks Kushman P.C.

(57) ABSTRACT

A device (10) for damping the vibration of a structure is provided. The device includes a main mass (12) and an auxiliary mass (20) mounted on a support (11) that is suitable for having one end held fixedly in the structure (1). The auxiliary mass (20) includes a threaded member (21) arranged around a drive screw (40) inside a casing (30) fastened to the main mass (12). The device includes manual drive (50) engaging the drive screw (40) to move the auxiliary mass (20) along the drive screw (40).

18 Claims, 2 Drawing Sheets

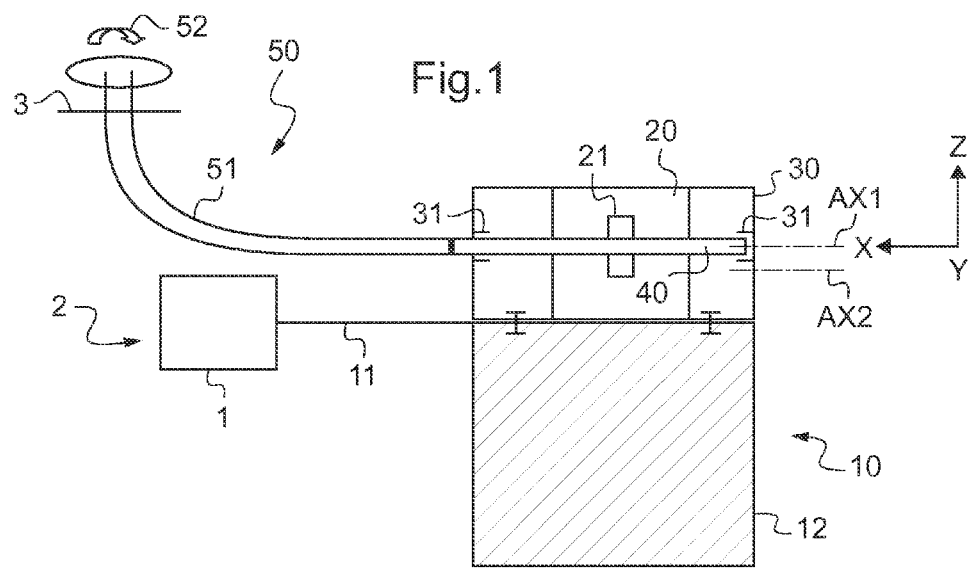
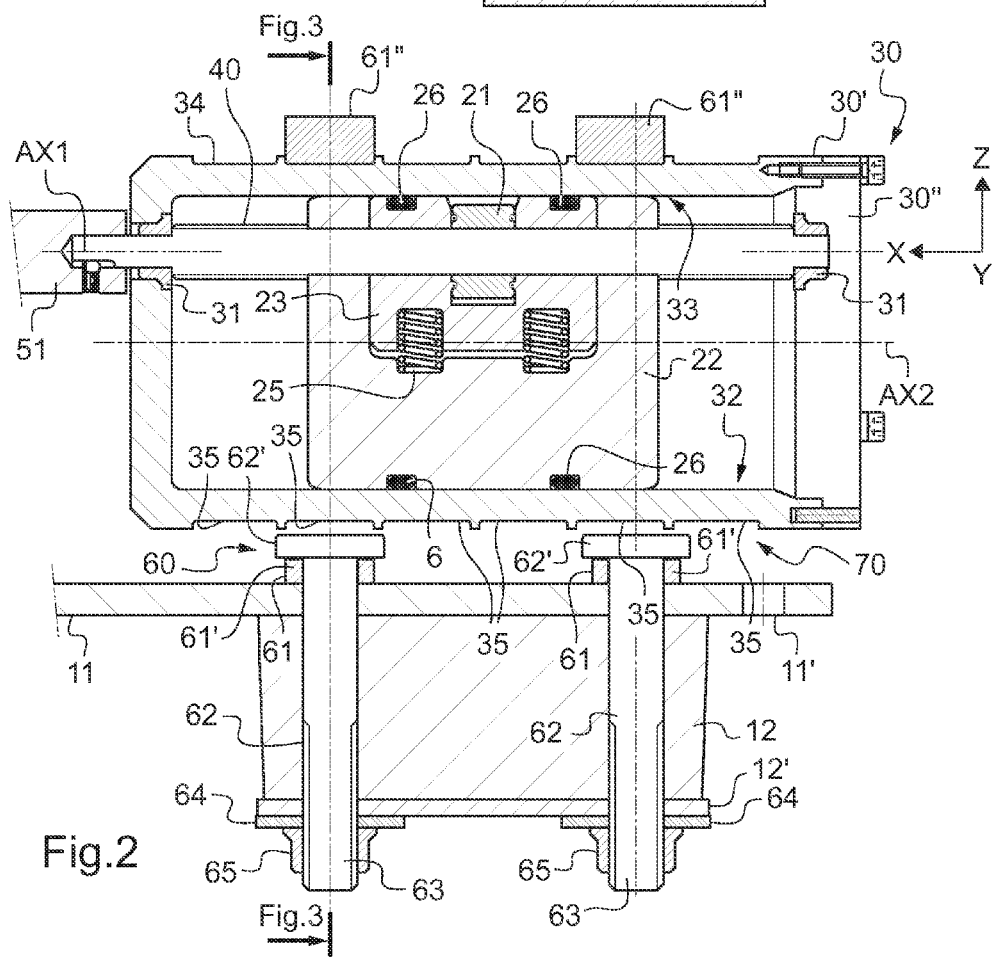

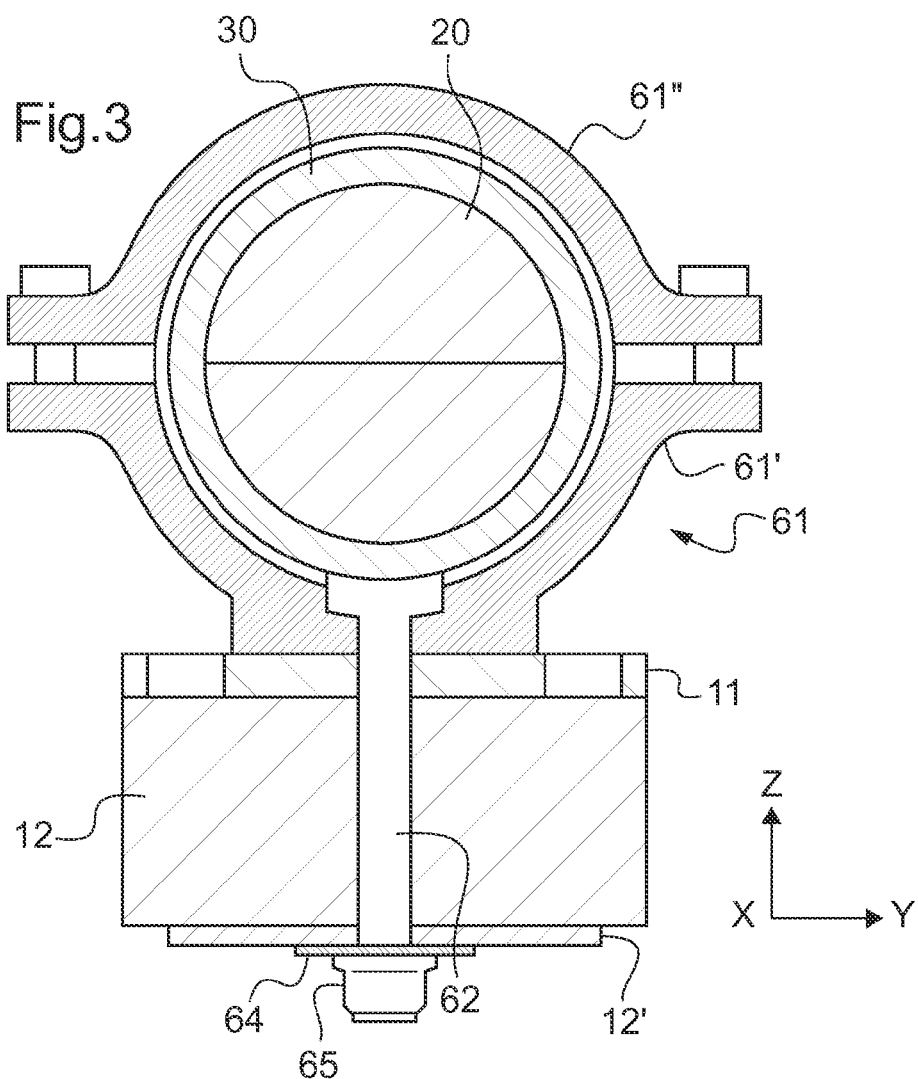
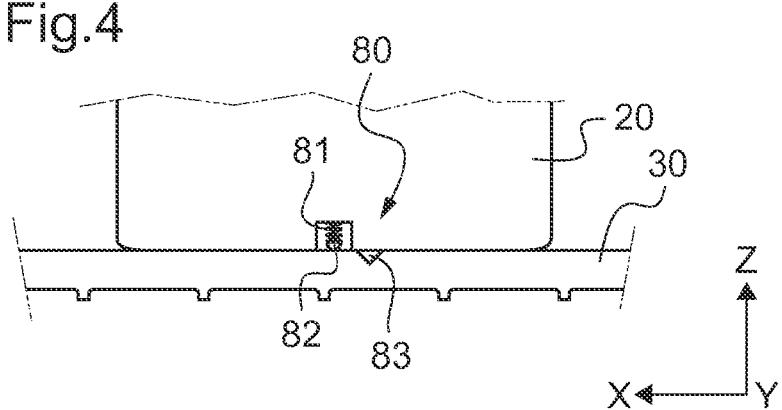

DEVICE FOR DAMPING THE VIBRATION OF A STRUCTURE

CROSS REFERENCE TO RELATED APPLICATIONS

This application claims the benefit of FR 10 02556 filed on Jun. 17, 2010, the disclosure of which is incorporated in its entirety by reference herein.

BACKGROUND OF THE INVENTION (1) Field of the Invention

The present invention relates to a device for damping the vibration of a structure. More particularly, the invention seeks to damp the vibration of a structure of a rotary-wing aircraft, in particular the cabin of a helicopter.

(2) Description of Related Art

By their nature, helicopters are subjected to high levels of vibration generated mainly in natural manner by said rotary wing. The various vibrations that exist degrade the comfort of the crew and passengers and also the state of parts and equipment of the helicopter, in particular parts and equipment located in the cabin of the helicopter.

The force torsor generated on the main lift and propulsion rotor of a helicopter by the rotation of its blades represents one of the main sources of the vibration in question.

In particular, the fuselage of a helicopter is subjected to forces and moments that are generated by the main rotor, at a reference frequency that is equal to the product of the number of blades of said main rotor multiplied by the frequency corresponding to the speed of rotation of said main rotor. The response of the fuselage is very sensitive to the difference between the resonant frequencies of the helicopter and said product.

The vibration as generated in that way is due mainly to the slipstream exciting resonant modes of the structure of the helicopter, and in particular the first lateral bending mode of the helicopter tail. The vibration due to this first lateral bending mode being excited generally corresponds to a frequency of a few hertz and it is extremely troublesome.

In order to remedy that, it is known to provide a passive vibration absorber that is generally implemented in the form of a resonator. Such an absorber is located at positions where it is desired to reduce vibration, with the absorber acting by being resonant at a predetermined frequency so as to reduce the relative vibration at said frequency.

The vibration absorber is in the form of a damper block fastened on a support such as a spring blade. One end of the support is held fixedly in an orifice formed in a suitable location of the helicopter structure, e.g. in the cabin.

When the structure is subjected to vibration, the absorber is thus excited by the structure. This results in vibration of the damper block, thereby generating a dynamic force that can, where appropriate, oppose the original vibration of the structure.

In order to optimize the efficiency of the absorber, it is appropriate to adjust the resonant frequency of the absorber so that said resonant frequency is equal to the frequency of the vibration of the structure that is to be damped.

Such an absorber may then be adjusted by adapting the mass of the damper block, e.g. by adding washers to the block or by removing them from it. The absorber may also be adjusted by varying the distance between the block and the fixed end of the support, for example by causing the block to slide along a groove formed in the support. The material of the support and its shape also have an influence on the resonant frequency of the absorber.

The absorber may be adjusted by positioning the helicopter on a vibrating bench driven at the reference frequency. A first sensor measures the effect of the vibration, in other words acceleration, where the support is held fixedly, and a second sensor measures the acceleration at the damper block.

The phase offset between those two accelerations is measured, which phase offset should be equal to 90° when the absorber is tuned. If it is not tuned, then the setting(s) of the absorber is/are modified in successive approximations in order to come as close as possible to said desired value of 90°.

It is therefore necessary to perform a considerable number of tests on the vibrating bench in order to obtain a satisfactory adjustment, with the number of tests being particularly large when the accuracy required for the phase offset is high.

Document FR 2 862 392 describes a method of tuning a vibration absorber on a reference frequency, in which method a measurement step is implemented followed by an adjustment step.

Independently of the method used for adjusting the absorber, it can be understood that it may be advantageous to adjust an absorber several times during its lifetime.

The initial adjustment of an absorber might not be optimized in certain stages of flight, e.g. because of aging of the structure fitted with the absorber, because of a modification to the structure, or indeed because of a change in the speed of rotation of the main rotor, in particular for a helicopter.

Document FR 2 739 670 teaches an improvement to a vibration absorber of the above-mentioned type. The damper block is made up both of a main mass that is fastened to a spring blade that is held fixedly at one end, and also of an auxiliary mass of position relative to the support that can be determined by an electric actuator such as a stepper motor. The actuator is controlled by a computer that servo-controls the position of the auxiliary mass on the basis of the phase offset between the two accelerations.

Such servo-control is relatively expensive since it requires special members.

SUMMARY OF THE INVENTION

An object of the present invention is thus to propose a device for damping the vibration of a structure, which device is of reasonable financial cost, and enables advantageous antivibration performance to be guaranteed without making it necessary to install an adjustment method that needs repeating and that is expensive.

According to the invention, a device for damping the vibration of a structure is provided with a main mass and an auxiliary mass mounted on a support that is suitable for having one end held fixedly in the structure, the auxiliary mass including a threaded member arranged around a drive screw inside a casing fastened to the main mass.

This device is remarkable in particular in that it includes manual drive means engaging the drive screw to move the auxiliary mass along the drive screw.

Under such circumstances, it is possible for a pilot, for example, to take hold of the drive means so as to turn the drive screw, with the drive means possibly comprising a flexible rotary control terminating in a wheel, for example. Turning the drive screw then causes the auxiliary mass to move in translation inside the casing, and thus relative to the main mass.

The movement of the auxiliary mass then has the effect of moving the center of gravity of the device, and consequently of modifying the resonant frequency of the device.

If a person, such as the pilot of a vehicle of the rotary-wing aircraft type, for example, perceives vibration, then that person can operate the drive means manually to move the auxiliary mass in a first direction that is optionally parallel to the support. The shift in the center of gravity will then give rise either to an increase or to a decrease in the vibration perceived by that person. It can be understood that if the person perceives an increase in vibration then the movable auxiliary mass needs to be moved in a second direction opposite to the first direction.

The invention thus provides an extremely simple mechanical device for making a vibration absorber, thereby reducing its financial cost.

Furthermore, the device enables the absorber to be adjusted so as to reduce the vibration perceived by the person operating the drive means. The comfort that results for that person therefore does not depend on any preprogrammed logic, for example.

The device may further include one or more of the following characteristics.

For example, the support may be a spring blade.

Furthermore, the main mass and the auxiliary mass may be optionally disposed on either side of the support.

Thus, the device optionally includes at least one fastener pin passing through the support and the main mass to fasten the main mass to the support, one end of the fastener pin co-operating with a clamp surrounding the casing.

For example, the fastener pin may be a bolt having a first end pressed against the clamp, said clamp thus being held between a head of the bolt and a top face of the support.

Conversely, a second end co-operates with a nut so as to press the main mass against a bottom face of the support.

The casing, which is advantageously sealed, is then fastened to the main mass via a clamp and a fastener pin, in particular. As a result, the auxiliary mass is fastened to the main mass via the casing, a clamp, and a fastener pin, in particular.

It should be observed that for connection to the drive means, the drive screw may project from the casing.

Furthermore, it is possible on the ground to adjust the device so that the resonant frequency of the device lies within a given range, said resonant frequency being variable from a first limit to a second limit of the range as a function of the position of the auxiliary mass within the casing.

More precisely, the device is provided with means for adjusting the position of the casing relative to the support and/or to the main mass, depending on the variant.

Under such circumstances, the device may include adjustment means for adjusting the position of the main mass relative to the support, and consequently the position of the auxiliary mass relative to the support. Said adjustment means may comprise a longitudinal slot formed in the support, and/or multiple holes formed through the support, the slot and the holes co-operating with the fastener pin, for example.

In alternative manner, or in addition, the device may include means for positioning the casing relative to the main mass.

When the device includes at least one clamp surrounding the casing in order to fasten the casing to the main mass, the positioning means may include a plurality of notches formed in an outer periphery of the casing, with the clamp co-operating with the notches. The clamp is then wedged in one of the notches of the casing. The positioning means then enables the longitudinal position of the casing to be adjusted relative to a clamp, and thus relative to the support supporting the main mass.

Furthermore, for the auxiliary mass having an axis of symmetry, the drive screw extends along a longitudinal axis parallel to the axis of symmetry, the longitudinal axis and the axis of symmetry being distinct.

An offset is thus observed between the longitudinal axis and the axis of symmetry, this offset being referred to as a "transverse" offset for convenience insofar as the offset is present in a direction that extends transversely relative to the longitudinal axis.

The presence of this transverse offset guarantees that there is no undue turning of the auxiliary mass about the drive screw within the casing. There is thus no need to provide dedicated blocking means.

Furthermore, the auxiliary mass optionally comprises a main mass and a secondary mass that is arranged in a groove of the main mass, at least one return means urging the main mass away from the secondary mass to press them respectively against a first inside surface and a second inside surface of the casing.

The return means may then be a prestressed spring, for example. Under such circumstances, the device leaves no slack between the auxiliary mass and the casing that surrounds it.

According to an aspect of the invention, the auxiliary mass includes sliding means that are kept in contact with the casing in order to facilitate movement in translation of the auxiliary mass.

The sliding means may be self-lubricating Teflon® skids.

Furthermore, the device may include touch-sensitive identification means for sensing a given position of the auxiliary mass inside said casing.

Such identification means may include a ball associated with the auxiliary mass by means of a spring and co-operating with a setback formed in the casing. The person operating the drive means can then sense whenever the ball co-operates with said setback, so as to be able to tell when the auxiliary mass is in a given position that may be referred to as a "neutral" position in which the ball is received in said setback.

BRIEF DESCRIPTION OF THE DRAWINGS

The invention and its advantages appear in greater detail from the context of the following description of embodiments given by way of illustration and with reference to the accompanying figures, in which:

FIG. 1 is a diagram summarizing a device of the invention;

FIG. 2 is a longitudinal section of said device;

FIG. 3 is a cross-section of said device; and

FIG. 4 is a diagram explaining touch-sensitive identification means.

Elements present in more than one of the figures are given the same references in each of them.

DETAILED DESCRIPTION OF THE PREFERRED EMBODIMENTS

It should be observed that three mutually orthogonal directions X, Y, and Z are identified in the figures.

The direction X is referred to as "longitudinal". The term "length" relates to a longitudinal dimension of the device in said longitudinal direction X.

The directions Y and Z are said to be "transverse".

FIG. 1 is a diagrammatic view of a device 10 for damping the vibration of a structure 1, e.g. a vehicle of the rotary-wing aircraft type.

The device 10 is provided with a support 11 fastened to the structure 1. The support 11 may be a spring blade having one end held fixedly in the structure 1.

Furthermore, the device 10 includes a main mass 12 and an auxiliary mass 20 that are mechanically connected together, the main mass 12 and the auxiliary mass 20 being arranged on either side of the support 11. More precisely, the auxiliary mass 20 is placed in a sealed casing 30 that is fastened to the support 11 and to the main mass 12.

The auxiliary mass also has a drive screw 40 passing therethrough, the drive screw being suspended from the casing 30 by bearings 31. Under such circumstances, the auxiliary mass 20 is fitted with a threaded member that co-operates with the thread of the drive screw 40, e.g. a nut 21 housed inside the auxiliary mass 20.

Consequently, rotary movement of the drive screw 40 about its longitudinal axis AX1 drives the auxiliary mass 40 in translation along said longitudinal axis inside the casing 30.

It should be observed that the longitudinal axis AX1 is parallel to an axis of symmetry AX2 of the auxiliary mass 20, i.e. a middle axis of said auxiliary mass 20 and of the casing 30, the longitudinal axis AX1 and the axis of symmetry AX2 being distinct.

In order to rotate the drive screw 40, the device 10 is provided with manual drive means 50 capable of being activated by an operator.

In the preferred variant shown, the drive means 50 may comprise a flexible tube 51 opening out firstly to the drive screw 40 and secondly to a knob 52, the flexible tube optionally passing through walls 3 of the vehicle 2 in order to reach said drive screw 40.

The device of the invention is thus exclusively mechanical.

Preferably, the drive screw 40 projects from the casing 30 in order to make it easier to connect to the drive means 50.

Using the drive means 50 placed in the cabin, a person can then cause the auxiliary mass 20 to move in a longitudinal direction substantially parallel to the support 11 when the support 11 is not being subjected to any deformation. That person can then manually adjust the resonant frequency of the device 10 to damp the vibration of the structure 1 depending on that person's physiological sensations.

FIG. 2 is a longitudinal section of the device 10.

In order to fasten the main mass 12 and the auxiliary mass 20 to the support 11, the device 10 includes fastener means 60.

The fastener means 60 shown in FIGS. 2 and 3 possess at least one fastener pin 62 passing through the support 11 and the main mass 12, each fastener pin having a threaded end 63 co-operating with a washer 64 and a nut 64 in order to press the main mass 12 against a first surface of the support 11.

It should be observed that the main mass 12 may optionally possess removable adjustment shims 12'.

In addition, the fastener means 60 include at least one clamp 61 comprising a first substantially semicircular portion 61' co-operating with a second substantially semicircular portion 61".

A head 62' on each fastener pin 62 then presses the first portion 61' of a clamp against a second surface of the support 11.

Thus, the casing 30 is fastened to the support 11 and to the main mass 12 via at least one clamp 61 and at least one fastener pin 62.

With reference to FIG. 2, the device 10 optionally includes two fastener pins.

The fastener means 60 may optionally serve to adjust the position of the main mass 12 relative to the support 11 so as to obtain a device 10 having a resonant frequency that can be varied within a given range as a function of the position of the auxiliary mass.

The device optionally includes means for adjusting the position of the main mass 12 relative to the support 11.

Such adjustment means may comprise an oblong hole or a plurality of circular holes 11' formed in the support for co-operating with the fastener pins 62.

Likewise, the device 10 may possess positioning means 70 for positioning the casing 30 relative to the main mass 12, the positioning means possibly co-operating with the fastener means 60, for example.

The positioning means 70 may possess a plurality of notches 35 formed in the outer periphery 34 of the casing 30, in particular where it faces the second surface of the support.

By placing a clamp 61 in one or another of the notches 35, the position of the casing 30 can be adjusted relative to the support 11 and to the main mass 12.

For a casing 30 comprising a cylindrical receptacle 30' closed by a removable stopper 30", the notches are formed in said receptacle 30'.

Furthermore, the auxiliary mass 20 may comprise a primary mass 22 and a secondary mass 23, e.g. of cylindrical shape.

The secondary mass 23 is then housed in a groove 24 in the primary mass 22. The primary mass 22 and the secondary mass 23 are thus mainly in alignment on a transverse direction perpendicular to the drive screw 40.

Furthermore, the device 10 is fitted with at least one return means 25 having the function of moving the primary mass 22 away from the secondary mass 23 so as to press them respectively against a first inside surface 32 and a second inside surface 33 of the casing 30. This characteristic guarantees that there is no slack between the auxiliary mass 20 and the inside periphery of the casing 30.

By way of example, the device 10 may possess two return means 25 of the prestressed spring type.

Nevertheless, in order to avoid the auxiliary mass 20 jamming inside the casing 30, it may be advantageous to provide sliding means 26. For example, portions of the auxiliary mass 20 that are in contact with the casing 30 may be provided with sliding means 26, such as Teflon® skids, for example.

With reference to FIG. 4, the device 10 may possess touch-sensitive identification means 80. The touch-sensitive identification means 80 enable the person operating the drive means to tell whether the auxiliary mass is in a given position, corresponding to a resonant frequency centered on the given range that can be covered by the device 10, for example.

One such touch-sensitive identification means may possess a ball 82 placed in a recess in the auxiliary mass 20, and a spring 81 urging the ball out from said recess.

Furthermore, the touch-sensitive identification means 80 may include a setback 83 formed in the casing 30. When the ball is in register with said setback, it drops into the setback.

The person driving the auxiliary mass can thus feel the ball entering into and leaving the setback.

Naturally, the present invention may be subjected to numerous variations as to its implementation. Although several embodiments are described, it will readily be understood that it is not conceivable to identify exhaustively all possible embodiments. It is naturally possible to envisage replacing any one of the means described by equivalent means without going beyond the ambit of the present invention.

What is claimed is:

1. A device for damping vibration of a structure, the device comprising:
    a support having one end held fixedly in the structure;
    a main mass fastened to the support;
    an auxiliary mass mounted on the support, said auxiliary mass including a primary mass and a secondary mass, wherein the secondary mass is arranged in a groove of the primary mass;
    a casing mounted on the support, wherein the auxiliary mass is disposed and movable within the casing;
    a spring positioned to bias the primary mass away from the secondary mass thereby pressing the primary mass against a first inside surface of the casing and pressing the secondary mass against a second inside surface of the casing;
    a drive screw engaging the auxiliary mass along a longitudinal axis parallel being offset from an axis of symmetry of the auxiliary mass; and
    a manual drive means engaging and actuating the drive screw to move the auxiliary mass along the drive screw thereby moving the center of gravity of the device to modify the resonant frequency of the device.

2. The device according to claim 1 wherein the casing includes a positioning means to position the casing relative to the main mass.

3. The device according to claim 1, wherein the drive screw extends through and engages both the primary mass and the secondary mass.

4. The device according to claim 1 wherein the secondary mass includes a threaded member that co-operates with the drive screw to move of the auxiliary mass upon actuation of the drive screw.

5. A device for damping vibration of a structure, the device comprising:
    a support having one end held fixedly in the structure;
    a main mass fastened to the support;
    an auxiliary mass mounted on the support, said auxiliary mass including a primary mass and a secondary mass, wherein the secondary mass is arranged in a groove of the primary mass;
    a casing mounted on the support, wherein the auxiliary mass is disposed and movable within the casing; and
    at least one return means urging the primary mass away from the secondary mass to press the primary mass against a first inside surface of the casing and the secondary mass against a second inside surface of the casing respectively;
    a drive screw engaging the auxiliary mass and extending though both the primary mass and the secondary mass; and
    a manual drive means engaging and actuating the drive screw to move the auxiliary mass along the drive screw thereby moving the center of gravity of the device to modify the resonant frequency of the device.

6. The device according to claim 5, wherein the drive screw extends along a longitudinal axis parallel and offset from an axis of symmetry of the auxiliary mass.

7. The device according to claim 5 wherein the secondary mass includes a threaded member that co-operates with the drive screw to move the auxiliary mass upon actuation of the drive screw.

8. The device according to claim 6 wherein the casing includes a positioning means to position the casing relative to the main mass.

9. The device according to claim 5, wherein the support is a spring blade.

10. The device according to claim 5, wherein the main mass and the auxiliary mass are located on either side of the support.

11. The device according to claim 5, further comprising at least one fastener pin passing through the support and the main mass to fasten the main mass to the support, one end of the fastener pin co-operating with a clamp surrounding the casing.

12. The device according to claim 5, wherein the drive screw projects from the casing.

13. The device according to claim 5, further comprising an adjustment means for adjusting the position of the main mass relative to the support.

14. The device according to claim 5, further comprising a positioning means for positioning the casing relative to the main mass.

15. The device according to claim 14, further comprising at least one clamp surrounding the casing in order to fasten the casing to the main mass, wherein the positioning means includes a plurality of notches formed in an outer periphery of the casing, the clamp co-operating with the notches.

16. The device according to claim 5, wherein the auxiliary mass includes sliding means that is kept in contact with the casing.

17. The device according to claim 5 further comprising touch-sensitive identification means for sensing a given position of the auxiliary mass inside the casing.

18. The device according to claim 5 further comprising a nut housed inside the auxiliary mass that co-operates with the drive screw.

* * * * *